US010602178B1

(12) United States Patent
Daede

(10) Patent No.: US 10,602,178 B1
(45) Date of Patent: Mar. 24, 2020

(54) SYSTEMS AND METHODS FOR FRAME CONTEXT SELECTION

(71) Applicant: Mozilla Corporation, Mountain View, CA (US)

(72) Inventor: Thomas Daede, Mountain View, CA (US)

(73) Assignee: Mozilla Corporation, Mountain View, CA (US)

( * ) Notice: Subject to any disclaimer, the term of this patent is extended or adjusted under 35 U.S.C. 154(b) by 68 days.

(21) Appl. No.: 15/851,179

(22) Filed: Dec. 21, 2017

(51) Int. Cl.
| | |
|---|---|
| *H04N 19/517* | (2014.01) |
| *H04N 19/139* | (2014.01) |
| *H04N 19/593* | (2014.01) |
| *H04N 19/527* | (2014.01) |
| *H04N 19/172* | (2014.01) |

(52) U.S. Cl.
CPC ......... *H04N 19/517* (2014.11); *H04N 19/139* (2014.11); *H04N 19/172* (2014.11); *H04N 19/527* (2014.11); *H04N 19/593* (2014.11)

(58) Field of Classification Search
CPC .. H04N 19/517; H04N 19/172; H04N 19/527; H04N 19/139; H04N 19/593
See application file for complete search history.

(56) References Cited

U.S. PATENT DOCUMENTS

| | | | | |
|---|---|---|---|---|
| 2004/0136461 | A1* | 7/2004 | Kondo | H04N 19/105 375/240.16 |
| 2006/0133494 | A1* | 6/2006 | Saxena | H04N 19/196 375/240.16 |
| 2014/0140400 | A1* | 5/2014 | George | H04N 19/52 375/240.12 |
| 2016/0127678 | A1* | 5/2016 | Zhang | H04N 19/527 348/441 |
| 2018/0270502 | A1* | 9/2018 | Mukherjee | H04N 19/105 |
| 2018/0302640 | A1* | 10/2018 | Li | H04N 19/513 |
| 2019/0020900 | A1* | 1/2019 | Chiang | H03M 7/40 |

* cited by examiner

*Primary Examiner* — Joseph Suh
(74) *Attorney, Agent, or Firm* — Dergosits & Noah LLP; Todd A. Noah

(57) ABSTRACT

Content to be encoded by an encoder may be defined by a sequence of values chosen from a set of possible values. Individual values of the set of possible values may have a probability of occurrence in the sequence of values. The content may form a sequence of frames, such as a video sequence. The encoder may allocate sets of buffers for storage of reference frames, frame contexts (including probability tables), and encoded frames. Individual context buffers (including individual probability tables) may be associated with individual reference frames. Encoding of a particular frame may be based on selecting a particular frame context from a context buffer, the particular probability table therein, and the content of the particular frame.

20 Claims, 5 Drawing Sheets

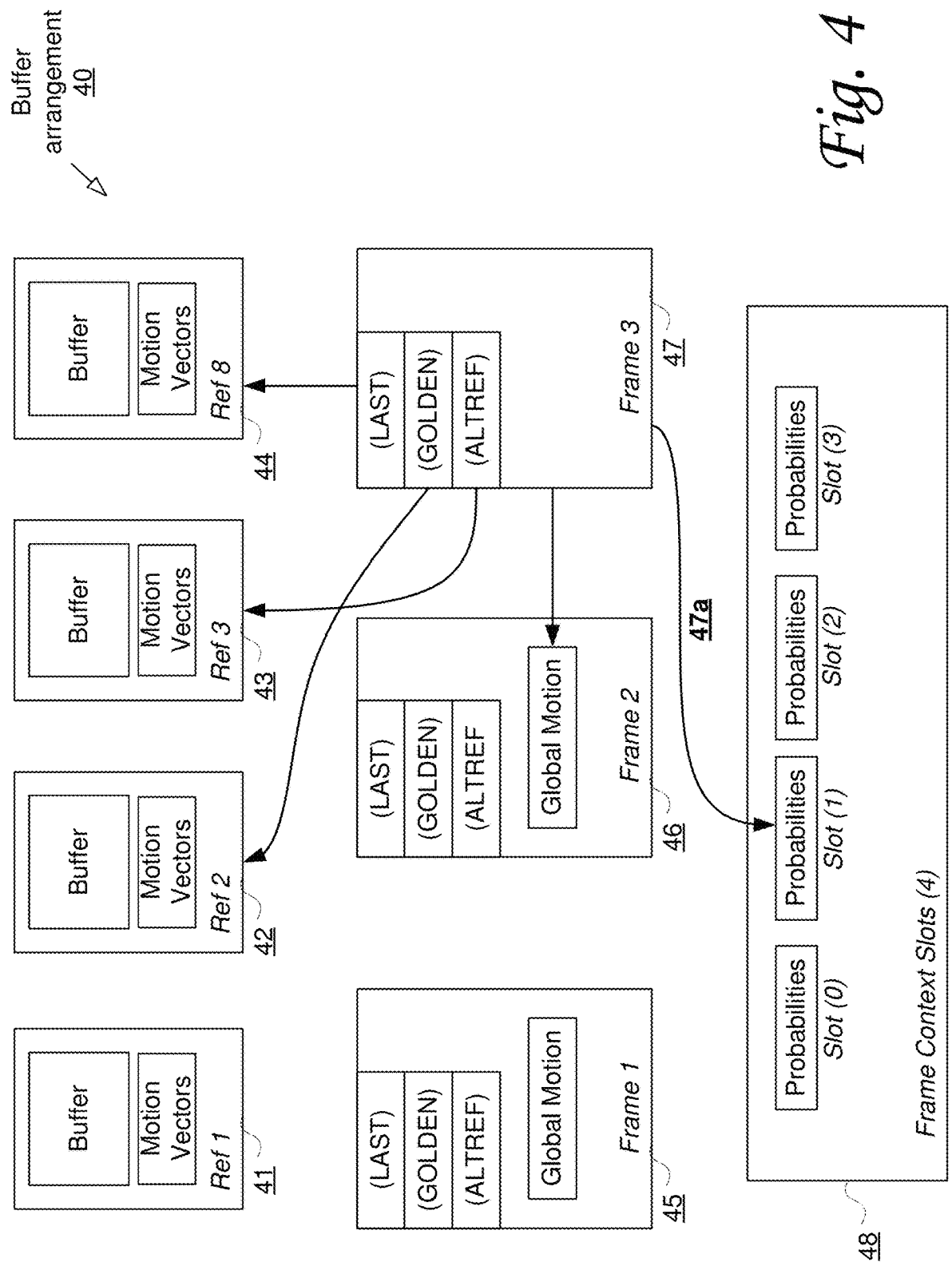

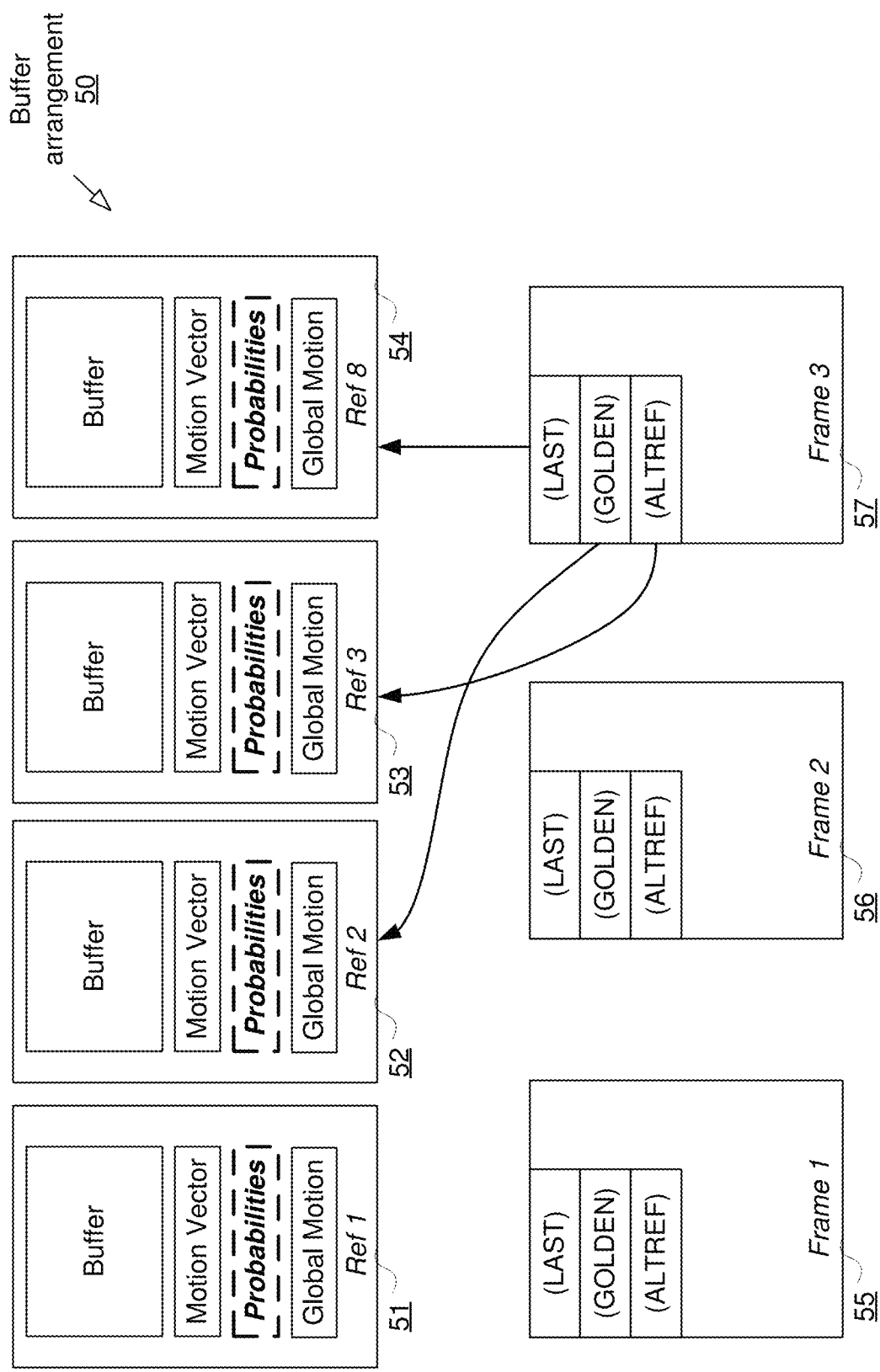

SYSTEMS AND METHODS FOR FRAME CONTEXT SELECTION

SUMMARY

One aspect of this disclosure relates to encoding content that includes a set of frames to be encoded. A system configured to encode content may be referred to as an encoder. Content to be encoded may be obtained. As used herein, the term "obtaining" may include one or more of accessing, acquiring, analyzing, determining, examining, locating, receiving, retrieving, reviewing, and/or otherwise obtaining. One aspect of this disclosure relates to decoding encoded content. A system configured to decode encoded content may be referred to as a decoder. Content to be decoded may be obtained.

The content to be encoded may be defined by a sequence of values. The values may be chosen from one or more sets of possible values. Individual values of the set of possible values may have a probability of occurrence in the sequence of values. The set of possible values may correspond to a set of possibilities of an individual value occurring. The values of the set of possible values may have a total probability value. The content may be encoded based on the set of possibilities. The content to be encoded may be arranged and/or organized in frames, in particular for video sequences. For example, the set of frames to be encoded may be ordered. For example, in some embodiments, the content to be encoded may be obtained from a system or device that has captured a video sequence, including but not limited to a video camera. Alternatively, and/or simultaneously, the content to be encoded may be obtained from a system or device that has generated a video sequence, including but not limited to a video game device.

Encoding of a particular frame may depend of one or more other frames, which may be referred to as reference frames. In other words, the particular frame is dependent on (or has a dependency on) the one or more reference frames. In some embodiments, to improve temporal scalability and/or loss resilience, a decoder needs to be able to determine which reference frames are needed to decode a current frame. In other words, the decoder needs to determine and/or track the dependencies for the current frame that is being decoded.

In some embodiments, dependencies may be explicit and/or express, e.g., by referring to a frame number in the encoded content and/or by using a description that can be resolved by the decoder, such as, by way of non-limiting example, a reference to "the immediately preceding frame". Other types of explicit and/or express dependencies are considered within the scope of this disclosure. Alternatively, and/or simultaneously, in some embodiments, dependencies may be implicit and/or implied.

Systems that encode and/or decode content may include one or more processors, and/or other components. The processor(s) may be configured by machine-readable instructions. Executing the machine-readable instructions may cause the processor(s) to facilitate encoding content. The machine-readable instructions may include one or more computer program components. The computer program components may include one or more of a memory management component, a reference frame storage component, a frame context storage component, a frame buffer storage component, a content component, a frame context selection component, a probability component, an encode component, a decode component, and/or other computer program components.

The memory management component may be configured to allocate, manage, and/or control storage elements (e.g., memories, buffers, FIFOs, and/or other storage elements) for the storage of information.

The reference frame storage component may be configured to allocate, manage, and/or control storage elements for the storage of frames and/or information related to frames. For example, the reference frame storage component may be configured to allocate a set of buffers for storage of a set of reference frames.

The frame context storage component may be configured to allocate, manage, and/or control storage elements for the storage of context information and/or information related to context information. For example, the frame context storage component may be configured to allocate a set of buffers for storage of a set of frame contexts.

The frame buffer storage component may be configured to allocate, manage, and/or control storage elements for the storage of encoded frames and/or information related to encoded frames. For example, the frame buffer storage component may be configured to allocate a set of buffers for the storage of encoded frames.

The content component may be configured to obtain content to be encoded and/or other information. In some embodiments, the content to be encoded may include one or more of an image, a video sequence, and/or other content. The content may be defined by a sequence of values. The values may be chosen from one or more sets of possible values. Individual values of the set of possible values may have a probability of occurrence in the sequence of values. The values of the set of possible values may have a total probability value. The set of possible values may include a first value.

In some embodiments, the set of possible values may be arranged in an ordered sequence. The first value may appear first in the ordered sequence. In some embodiments, the first value may correspond to a value of zero. In some embodiments, the first value may have the highest probability of occurrence.

The frame context selection component may be configured to select one or more frame contexts from a set of frame contexts. For example, the frame context selection component may be configured to select a particular frame context from a set of context buffers.

The probability component may be configured to obtain one or more sets of probabilities. A set of probabilities may be associated with a set of possible values. The values may form a sequence that defines the content to be encoded. In some embodiments, a set of probabilities may be obtained from a particular probability table. For example, a particular set of probabilities may be obtained from the probability table included in a particular frame context.

The encode component may be configured to encode content based on a set of probabilities, a probability table, an entropy coding, an interval, and/or other information. The content to be encoded may be one or more frames that form a video sequence.

The decode component may be configured to decode encoded content based on a set of probabilities, a probability table, an entropy coding, an interval, and/or other information. The content to be decoded may be one or more frames that form a video sequence.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 4 and 5 illustrate exemplary buffer arrangements that may be used by an encoder system in accordance with one or more embodiments.

DETAILED DESCRIPTION

Figure 1:
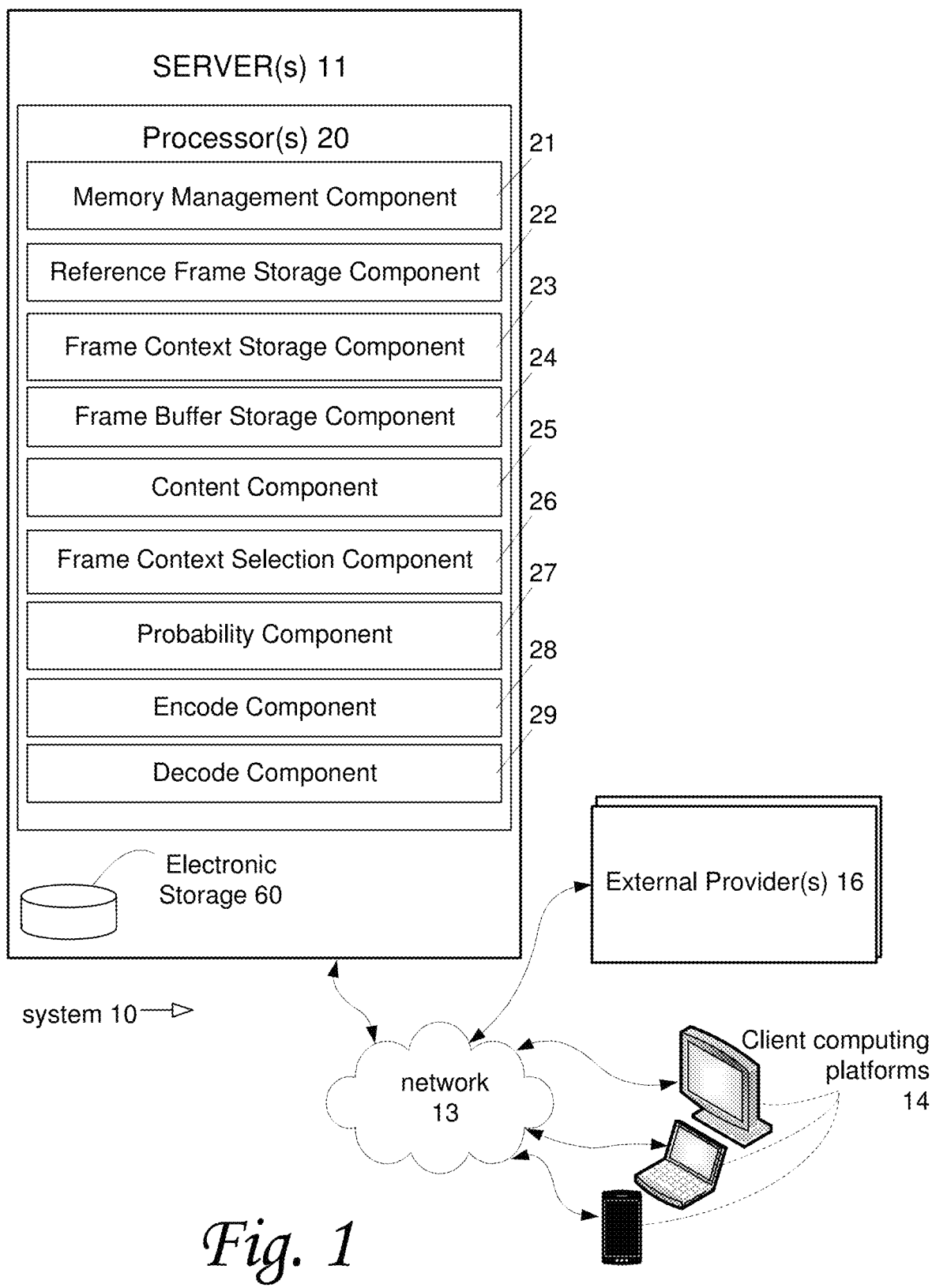
FIG. 1 illustrates a system that encodes content in accordance with one or more embodiments.

In some cases, systems configured to encode or decode content, including but not limited to system 10 in FIG. 1, may conform to one or more coding standards and/or specifications. By way of non-limiting examples, a particular video coding standard may be H.264 or HEVC/H.265. Another particular video coding standard is AV1 (AOMedia Video 1). Published techniques and concepts used in these standards (and their predecessors) are incorporated in this disclosure by reference and considered within the scope of this disclosure. For example, the concept of I-frames, P-frames, and B-frames is familiar to persons having ordinary skill in the art of video coding. Within a particular standard, certain features may be required, while others may be optional. Encoding content according to a widely accepted and available standard may be important to facilitate effective distribution of the content. A proliferation of proprietary standards would hamper such distribution, in particular internet-based distribution. Within a particular standard, improvements in encoding technology (e.g., in compression rate or required bitrate, or in video quality) may be desirable, provided that the encoded content can be readily decoded. In other words, implementations of a particular coding standard may be limited by resource constraints and/or other constraints.

FIG. 1 illustrates a system 10 for encoding content. System 10 may include one or more servers 11, one or more processors 20, electronic storage 60, and/or other components. In some embodiments, system 10 may connect to and/or otherwise operate in conjunction with a network 13. For example, content to be encoded may be obtained through network 13. In some embodiments, system 10 may include and/or operate in conjunction with one or more client computing platforms 14. For example, a particular client computing platform 14 may be a video camera that has captured a video sequence. The video sequence may be transferred to system 10 to be encoded. As another example, a particular client computing platform 14 may be a personal computing device that is configured to decode encoded content as it streams over network 13.

Referring to FIG. 1, in some embodiments, server 11 may include one or more processors 20. In some embodiments, processor 20 may be configured to provide information-processing capabilities in system 10. As such, processor 20 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 20 may be configured to execute one or more machine-readable instructions to facilitate encoding content. The machine-readable instructions may include one or more computer program components. The machine-readable instructions may include one or more of a memory management component 21, a reference frame storage component 22, a frame context storage component 23, a frame buffer storage component 24, a content component 25, a frame context selection component 26, a probability component 27, an encode component 28, a decode component 29, and/or other computer program components.

Electronic storage 60 may be configured to include electronic storage medium that electronically stores information. Electronic storage 60 may store software algorithms, information determined by processor 20, information received remotely, and/or other information that enables system 10 to function properly. For example, electronic storage 60 may store information relating to content, values, set of possible values, probabilities of occurrence, entropy coding, interval, approximation error, and/or other information.

Memory management component 21 may be configured to allocate, manage, and/or control storage elements (e.g., memories, buffers, FIFOs, and/or other storage elements) for the storage of information. In some embodiments, memory management component 21 may be configured to allocate electronic storage 60 and/or sections thereof.

Reference frame storage component 22 may be configured to allocate, manage, and/or control storage elements for the storage of frames and/or information related to frames. For example, reference frame storage component 22 may be configured to allocate a set of buffers for storage of a set of reference frames. In some embodiments, the set of buffers may include 4, 6, 8, 16, or more buffers (also referred to as reference buffers or reference frame buffers). In some cases, using a set of 6 reference frame buffers may be preferred. In some cases, using a set of 8 reference frame buffers may be preferred. By way of non-limiting example, FIG. 4 illustrates an exemplary buffer arrangement 40 that may be used by an encoder system. Buffer arrangement 40 includes a set of four reference frames 41, 42, 43, and 44 (also labeled "ref 1," "ref 2," "ref 3," and "ref 8"). Each of the four reference frames includes a "Buffer" for encoded content, in particular previously encoded content. For example, one or more of the four reference frames may be used to store one or more I-frames. Each of the four reference frames may further include information relevant to the encoding of that frame, such as, by way of non-limiting example, motion vectors (labeled "motion vectors" in FIG. 4).

In some implementations of a particular coding standard, encoding of the current frame may depend on previously encoded frames. In some implementations of a particular coding standard, encoding of the current frame may depend on both forward (or future) and backward (or previously encoded) reference frames.

Referring to FIG. 1, frame context storage component 23 may be configured to allocate, manage, and/or control storage elements for the storage of context information and/or information related to context information. For example, frame context storage component 23 may be configured to allocate a set of buffers for storage of a set of frame contexts. In some embodiments, the set of buffers may include 4, 6, 8, 16, or more buffers (also referred to as context buffers or frame context buffers). In some cases, using a set of 6 frame context buffers may be preferred. In some cases, using a set of 8 frame context buffers may be preferred. Referring to FIG. 4, by way of non-limiting example, buffer arrangement 40 includes a set 48. Set 48 includes four buffers or "frame context slots" (also individually labeled "slot 0," "slot 1," "slot 2," and "slot 3"). Each of the four frame context slots includes a set of probabilities (e.g., a probability table, labeled "probabilities") for encoding content. In some implementations of a particular coding standard, one of more of the frame context slots may include a probability table that refers to a particular reference frame. This particular reference frame may be different from either the four reference frames 41, 42, 43, and 44, and/or the reference frames indicated by indicators (e.g., "last," "golden," and "altref") of buffers 45, 46, and 47. In such a case, the particular reference frame may be a hidden and/or implicit dependency of the frame that is currently being encoded. In some implementations of the particular coding standard, one or more of the frame context slots may be managed (e.g., saved, loaded, modified, and/or otherwise processed). This is an example of a hidden and/or implicit dependency that may be unknown or even undeterminable by the decoder. Even if this dependency can be determined, the existence of this dependency reduces temporal scalability and/or loss resilience of the decoder. In other words, buffer arrangement 40 as depicted in FIG. 4 may cause an undesirable effect due to this type of hidden and/or implicit dependency.

In some embodiments, frame context storage component 23 may be configured to allocate, manage, and/or control storage elements for the storage of context information and/or information related to context information in a manner such that individual frame context buffers are associated with individual reference frame buffers. In this case, the probability table in a particular frame context buffer is associated with the particular reference frame stored in a particular reference frame buffer. For example, encoding of the particular reference frame may be accomplished or have been accomplished using the probability table in the particular frame context buffer. In some embodiments, the set of buffers for storage of a set of reference frames may have the same number of elements as the set of buffers for storage of a set of frame contexts. In some embodiments, the association between individual frame context buffers and individual reference frame buffers may be fixed and unchanging, such that system 10 can rely on this association. For example, "slot 0" may be permanently associated with reference frame 41, "slot 1" with reference frame 42, "slot 2" with reference frame 43, and "slot 3" with reference frame 44. Such an arrangement of buffer allocations is depicted in FIG. 5.

Referring to FIG. 1, frame buffer storage component 24 may be configured to allocate, manage, and/or control storage elements for the storage of encoded frames and/or information related to encoded frames. For example, frame buffer storage component 24 may be configured to allocate a set of buffers for the storage of encoded frames. In some embodiments, the set of buffers may include 2, 3, 4, 6, 8, 16, or more buffers for previously encoded frames or the frame that is currently being encoded. In some cases, using a set of 6 buffers may be preferred. In some cases, using a set of 8 buffers may be preferred. Referring to FIG. 4, by way of non-limiting example, buffer arrangement 40 includes a set of three buffers for previously encoded frames or the frame that is currently being encoded, the set of three buffers 45, 46, and 47 (also labeled "frame 1," "frame 2," and "frame 3"). As depicted, buffer 47 ("frame 3") is the frame that is currently being encoded, also referred to as the current frame buffer. Each of the three buffers includes indicators (e.g., registers or links) that refer to other frames, e.g. reference frames allocated by reference frame storage component 22). In some embodiments, individual buffers may include 3, 4, 6, 8, or more indicators. As illustrated, the three indicators in each buffer are labeled "last," "golden," and "altref". For example, the indicators for buffer 47 ("frame 3") refer to reference frame 44 ("ref 8"), reference frame 42 ("ref 2"), and reference frame 43 ("ref 3"), respectively. The naming and usage of these indicators is based on convention and may be implementation-specific. By way of non-limiting example, in some implementations, "last" may refer to the most recent reference frame, "golden" may refer to the most recent I-frame, and "altref" may refer to the most recent P-frame. Buffers 45 and 46 may further include information relevant to the encoding of that frame, such as, by way of non-limiting example, global motion information (labeled "global motion" in FIG. 4). Buffer 47 may further include links to set 48 (the frame context slots), to particular global motion information (here, referring to buffer 46), and/or other links used to encode the content of the current frame. In some implementations, the encoding of buffer 47 may depend on the probability table of a particular reference frame, as depicted by a link 47a in FIG. 4. This is an example of a hidden and/or implicit dependency that may be unknown or even undeterminable by the decoder. Even if this dependency can be determined, the existence of this dependency reduces temporal scalability and/or loss resilience of the decoder.

In some implementations, system 10 may be configured to encode which frame context slot to use in the bitstream. For example, the connection between reference frames and frame contexts may be encoded in the bitstream format. In other implementations, an encoder may be configured to make this connection.

Referring to FIG. 1, content component 25 may be configured to obtain content to be encoded and/or other information. In some embodiments, the content to be encoded may include one or more of an image, a video sequence, and/or other content. For example, a video sequence may include an ordered set of multiple frames, including, for example, a first frame, a second frame, a third frame, a fourth frame, and so forth. The content may be defined by a sequence of values. The values may be chosen from one or more sets of possible values. For example, the possible values may be digital values such as 0 and 1, color values, and/or other values. Individual values of the set of possible values may have a probability of occurrence in the sequence of values. The values of the set of possible values may have a total probability value. The set of possible values may include a first value.

In some embodiments, the content to be encoded may be stored as one or more digital file(s). Content component 25 may obtain content to be encoded from one or more locations. For example, content component 25 may obtain the content from a storage location, such as electronic storage 60, electronic storage of information and/or signals generated by one or more sensors (e.g., image sensors, video cameras, etc.), electronic storage of a device accessible via a network, and/or other locations. Content component 25 may obtain the content from one or more hardware components (e.g., an image sensor) and/or one or more software components (e.g., software running on a computing device).

The content may be defined by one or more sequences of values and/or other information. The values may be chosen from one or more sets of possible values. For example, a sequence of values may include values from different sets of possible values (e.g., chosen from multiple sets of possible). A sequence of values may include values from a single set of possible values. Individual values of the set(s) of possible values may have a probability of occurrence in the sequence(s) of values. All of the values of a set of possible values may have a total probability value. A set of possible values may include a first value and/or other values.

In some embodiments, the set(s) of values may be arranged in an ordered sequence and the first value may appear first in the ordered sequence. For example, a set of possible values may include an alphabet with one or more elements arranged in an ordered sequence. The elements in the alphabets may be referred to as symbols. The sequence of values defining the content may be referred to as a string over the alphabet. In some embodiments, the first value may correspond to a value of zero. In some embodiments, the first value may have the highest probability of occurrence. For example, in source coding application, such as audio and video coding, the first value in the alphabet may be the value of zero. The value of zero may have the highest probability of occurrence in the string for source coding application.

A set of possible values may include an alphabet of M possible values. The probability of individual values in the alphabet may be estimated to be $p(j)$, $0 \leq j \leq M$. The cumulative probability of individual values may be represented by:

$$f_t(j) \triangleq \begin{cases} 0, & j = 0 \\ \sum_{j=0}^{j-1} p(k), & 0 < j \leq M \end{cases}$$

The values $p(j)$ may be integers to avoid floating point math. Total probability value may be represented by:

$$f_t \triangleq f_t(M)$$

The mathematical probability of each value of the alphabet may be represented by:

$$\frac{p(j)}{f_t}$$

The probabilities of the values may be calculated based on the sequence of values (e.g., input string) defining the content or based on a historical distribution. For example, the probabilities of the values may be calculated by counting the symbols in the input string. The probabilities of the values may be known based on a frequencies table (e.g., global English frequencies table listing the probabilities that a particular letter will appear in a word).

Frame context selection component 26 may be configured to select one or more frame contexts from a set of frame contexts. For example, frame context selection component 26 may be configured to select a particular frame context from a set of context buffers. The particular frame context may include a particular set of probabilities (e.g., a particular probability table). In some embodiments, exactly one probability table can be used to encode the current frame. In some embodiments, selection of a particular probability table may be explicit and/or express. For example, the selection may be based on a particular indicator (say, "golden") in the current frame buffer, or on the immediately preceding frame, and/or on other mechanisms that explicitly and/or expressly selects a particular probability table. In some embodiments, selection of a particular probability table may be implicit and/or implied. For example, selection of a particular probability table may be based on the ordering of the frames. For example, selection of a particular probability table may be based on the ordering of the reference frames (i.e., the ordering among the set of buffers for storage of the set of reference frames). In some implementations, encoders are configured to reorder frames for improved compression rate, required bitrate, video quality, and/or other improvements).

Probability component 27 may be configured to obtain one or more sets of probabilities. A set of probabilities may be associated with a set of possible values. The values may form a sequence that defines the content to be encoded. In some embodiments, a set of probabilities may be obtained from a particular probability table. For example, a particular set of probabilities may be obtained from the probability table included in a particular frame context, e.g., a frame context selected by frame context selection component 26.

In some embodiments, probability component 27 may be configured to update a set of probabilities during encoding of a frame of content. For example, probability component 27 may be configured to update a particular probability table during encoding, based on the content of the current frame.

Encode component 28 may be configured to encode content based on a set of probabilities, a probability table, an entropy coding, an interval, and/or other information. The content to be encoded may be one or more frames that form a video sequence. In some embodiments, the content to be encoded may be compressed by representing frequently occurring patterns/symbols with smaller amounts of bits and rarely occurring patterns/symbols with larger amounts of bits. For example, entropy coding may detect symbols representing the data at the input and compress the data by replacing symbols with certain variable-length code-words (bits representing coded symbol or string). The length of code-words may be approximately proportional to the negative logarithm of probability of occurrence of the particular symbols, resulting in more common (more probable) symbols being represented by shorter codes.

For example, entropy coding may maintain an interval [L, L+R) characterized by its lower bound, L, and its size (range), R. To encode a value (of the sequence of values defining content), the interval may be partitioned into sub-intervals of size roughly proportional to the probability of each possible value using a partition function. The lower bound and range may be updated to correspond to the sub-interval of the actual value to be encoded. When all symbols have been encoded, the encoder may generate/output a bit string corresponding to any number, C, in the final interval [L, L+R) (e.g., the one with the shortest binary representation). To decode a value, a decoder may start with the same interval as the encoder, use the same partition function to partition it into sub-intervals, and use the bit string written by the encoder to identify which sub-interval corresponds to the actual value that was encoded (i.e., the sub-interval which contains the number C). Other types of encoding are envisioned within the scope of this disclosure.

In some embodiments, limiting the size of the range to a fixed number of bits, $b_R$ (e.g., 16, 32) may prevent the need for arbitrary-precision arithmetic, which may be slow and require a large amount of storage. This may limit the number of bits of L that may be affected by partitioning the interval (with the exception of carries). This may limit the number of bits a decoder must examine to determine which sub-interval contains the number written by the encoder. When the value of R becomes too small, or potentially when a value is encoded or decoded, the value of R may be renormalized. The amount of scaling may be chosen based on a maximum that does not cause R to exceed the limit on the number of bits in its representation. L may be similarly scaled, with the top bits being output to a buffer (to eventually become part of C) on the encoder side. Similarly, a decoder may need to examine more bits of C to be able to determine the appropriate sub-interval for the next value to be decoded.

Usage of large number of bits in entropy coding may provide for higher compression accuracy but may lead to higher processing time and power consumption. For example, use of higher bit values in entropy coding may require usage of greater number/more complex hardware (e.g., registers), and operations on these values may include high latency, which may lead to higher power consumption/higher heat generation. Increasing the speed of entropy coding operation may lead to faster processing of information (e.g., faster encoding), lower power consumption, and/or lower heat generation.

A partition function may determine the bounds within an interval to represent particular values/symbols that appears in the input string. The partition function may be a strictly increasing monotonic function, with f not larger than the range (R) of the interval. For example, the range (R) may be limited to $b_R$ bits and $f_t$ may be limited to 2 to the power of $b_f$, with $b_f < b_R$. One example partition function is given by $$u_{ac}(f) = \left\lfloor \frac{fR}{f_t} \right\rfloor$$

Computing this partition function requires calculation of a product fR, which requires a $b_f \times b_R \rightarrow (b_f + b_R)$-bit multiply. This multiply may require usage of greater number/more complex hardware (e.g., registers) than desired. Moreover, multiplies may have higher latency than addition operations in hardware (e.g., used to update L and R). The division in the partition function may also be too expensive to use in a practical implementation at high data rates.

An example approach to reduce the size of the multiply may be to approximate the result by re-ordering the operations:

$$u_{approx}(f) = \begin{cases} f \left\lfloor \frac{R}{f_t} \right\rfloor, & 0 \le f < f_t \\ R, & f = f_t \end{cases}.$$

This approximation may reduce the multiply size to $b_f \times (b_R - b_f) \rightarrow b_R$ bits. However, this approximation amplifies the truncation error of the division, which decreases compression accuracy. In short, approximation may lead to there not being enough number of bits to represent the smallest possibilities, resulting in compression error. Moreover, all of the approximation error may be collected into the last possible value, essentially over-estimating p(M−1) and underestimating all of the other probabilities.

In some embodiments, encode component 28 may be configured to encode a current frame buffer based on one or more reference frames, the reference frames being referred to in the one or more indicators included in the current frame buffer. Additionally, encoding the current frame buffer may be based on a particular frame context and a particular probability table. For example, encoding may be based on a frame context that is selected by frame context selection component 26, and the probability table included in the selected frame context. Operation of encode component 28 may depend on the operation of other components of system 10, including but not limited to reference frame storage component 22, frame context storage component 23, frame buffer storage component 24, content component 25, frame context selection component 26, probability component 27, and/or other components.

In some embodiments, encode component 28 may be configured to encode multiple frames, including a first, second, and third frame, based on one or more reference frames. Additionally, encoding frames may be based on a particular frame context and a particular probability table. For example, encoding the first frame may be based on a first frame context that is selected by frame context selection component 26, and the probability table included in the selected first frame context. For example, encoding the second frame may be based on a second frame context that is selected by frame context selection component 26, and the probability table included in the selected second frame context, which may be different from the probability table included in the first frame context. For example, encoding the third frame may be based on a third frame context that is selected by frame context selection component 26, and the probability table included in the selected third frame context, which may be different from both the probability tables included in the first and second frame contexts.

In some embodiments, encode component 28 may be configured to control which previously encoded frames are to be used as dependencies of the current frame. For example, such control may be used to enhance temporal scalability by allowing a decoder to skip, e.g., every other frame.

By way of non-limiting example, FIG. 5 illustrates an exemplary buffer arrangement 50 that may be used by an encoder system, in particular system 10 in FIG. 1. In particular, buffer arrangement 50 in FIG. 5 remedies some of the undesirable features of buffer arrangement 40 in FIG. 4. In FIG. 5, buffer arrangement 50 includes a set of four reference frames 51, 52, 53, and 54 (also labeled "ref 1," "ref 2," "ref 3," and "ref 8"). Each of the four reference frames includes a "Buffer" for encoded content, in particular previously encoded content. For example, one or more of the four reference frames may be used to store one or more I-frames. Each of the four reference frames may further include information relevant to the encoding of that frame, such as, by way of non-limiting example, motion vectors and global motion information (labeled "motion vectors" and "global motion" in FIG. 5). For example, the set of buffers for storage of these reference frames may be allocated by a reference frame storage component such as reference frame storage component 22 in FIG. 1.

Referring to FIG. 5, buffer arrangement 50 includes a set of three buffers for previously encoded frames or the frame that is currently being encoded, the set of three buffers 55, 56, and 57 (also labeled "frame 1," "frame 2," and "frame 3"). As depicted, buffer 57 ("frame 3") is the frame that is currently being encoded, also referred to as the current frame buffer. Each of the three buffers includes indicators (e.g., registers or links) that refer to other frames, e.g. reference frames. In some embodiments, individual buffers may include 3, 4, 6, 8, or more indicators. As illustrated, the three indicators in each buffer are labeled "last," "golden," and "altref". For example, the indicators for buffer 57 ("frame 3") refer to reference frame 54 ("ref 8"), reference frame 52 ("ref 2"), and reference frame 53 ("ref 3"), respectively. Contrary to buffer arrangement 40, buffer arrangement 50 includes a set of buffers for storage of frame context (labeled "probabilities" in a box with a dashed line) such that individual frame contexts are associated with individual reference frames. Each frame reference is associated with a buffer that includes a set of probabilities (e.g., a probability table) that that frame reference. Each individual buffer that includes a probability table may be under control or management of a frame context storage component such as frame context storage component 23, but functionally each individual buffer may be associated with an individual reference frame buffer.

Referring to FIG. 1, decode component 29 may be configured to decode encoded content based on a set of probabilities, a probability table, an entropy coding, an interval, and/or other information. The content to be decoded may be one or more frames that form a video sequence. In some embodiments, decode component 29 may be configured to decode a current frame buffer based on one or more reference frames, the reference frames being referred to in the one or more indicators included in the current frame buffer. Additionally, decoding the current frame buffer may be based on a particular frame context and a particular probability table. For example, decoding may be based on a frame context and a probability table that are expressly or impliedly known to and/or determinable by the decoder.

In some embodiments, decode component 29 may be configured to determine whether any frame is missing that is needed to decode a current frame. This feature may be used for enhanced error resilience by allowing a decoder to request retransmission of a dropped frame. In some implementations, a decoder may be configured to avoid displaying a broken frame, by virtue of verifying in advance that all required dependent frames are available to decode the current frame.

Operation of decode component 29 may depend on the operation of other components of system 10, including but not limited to reference frame storage component 22, frame context storage component 23, frame buffer storage component 24, content component 25, probability component 27, and/or other components.

In some embodiments, features attributed to any one of reference frame storage component 22, frame context storage component 23, and frame buffer storage component 24 may be performed by memory management component 21. For example, in a particular embodiment of system 10, a particular implementation of an AV1 encoder may be configured to allocate, manage and/or control electronic storage 60 to include a set of reference frame, a set of frame context buffers, a set of previously encoded frames, the frame that is currently being encoded, and/or other information used to encode the current frame. As described elsewhere in this disclosure, individual frame context buffers may be associated with individual reference frame buffers.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although server 11, processor 20, and electronic storage 60 are shown to be connected to network 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 20 may wirelessly communicate with electronic storage 60. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 20 is shown in FIG. 1 as a single entity, this is for illustrative purposes only. In some embodiments, processor 20 may comprise a plurality of processing units. These processing units may be physically located within the same device, or processor 20 may represent processing functionality of a plurality of devices operating in coordination. Processor 20 may be configured to execute one or more components by software; hardware; firmware; some combination of software, hardware, and/or firmware; and/or other mechanisms for configuring processing capabilities on processor 20.

It should be appreciated that although computer components are illustrated in FIG. 1 as being co-located within a single processing unit, in implementations in which processor 20 comprises multiple processing units, one or more of computer program components may be located remotely from the other computer program components, or duplicated in more than one location.

While the computer program components are described herein as being implemented via processor 20 through machine-readable instructions, this is merely for ease of reference and is not meant to be limiting. In some embodiments, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 20 be configured to execute one or more additional computer program components that may perform some or all of the functionality attributed to one or more of computer program components described herein.

In some embodiments, some or all of the functionalities of the computer program components/systems describes herein may be provided by one or more external resources. External sources may include hosts/sources of information, computing, and/or processing and/or other providers of information, computing, and/or processing outside of system 10.

The electronic storage media of electronic storage 60 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 60 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 60 may be a separate component within system 10, or electronic storage 60 may be provided integrally with one or more other components of system 10 (e.g., processor 20). Although electronic storage 60 is shown in FIG. 1 as a single entity, this is for illustrative purposes only. In some embodiments, electronic storage 60 may comprise a plurality of storage units. These storage units may be physically located within the same device, or electronic storage 60 may represent storage functionality of a plurality of devices operating in coordination.

Figure 2:
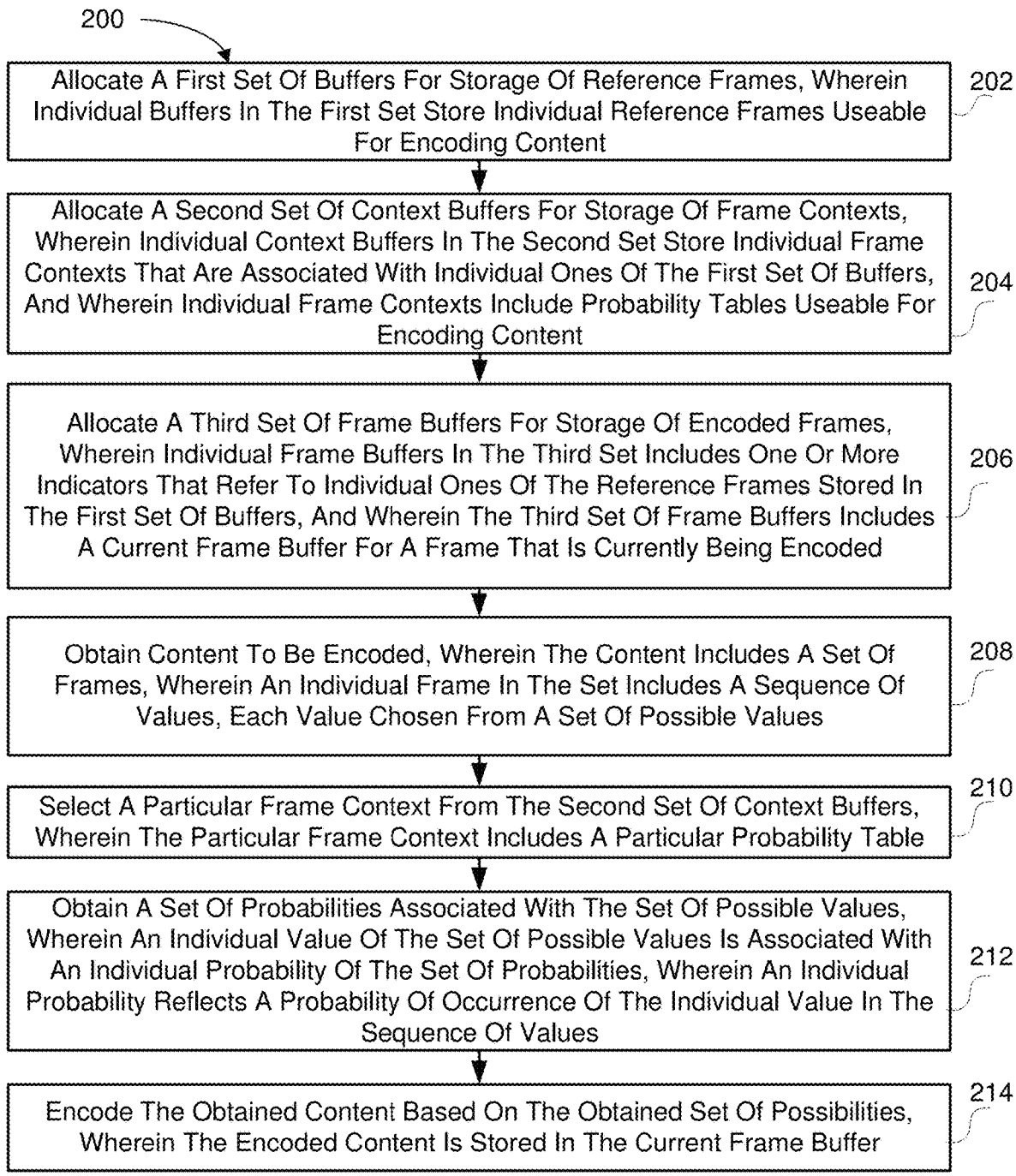
FIGS. 2-3 illustrate methods for encoding content and decoding encoded content in accordance with one or more embodiments.
Figure 3:
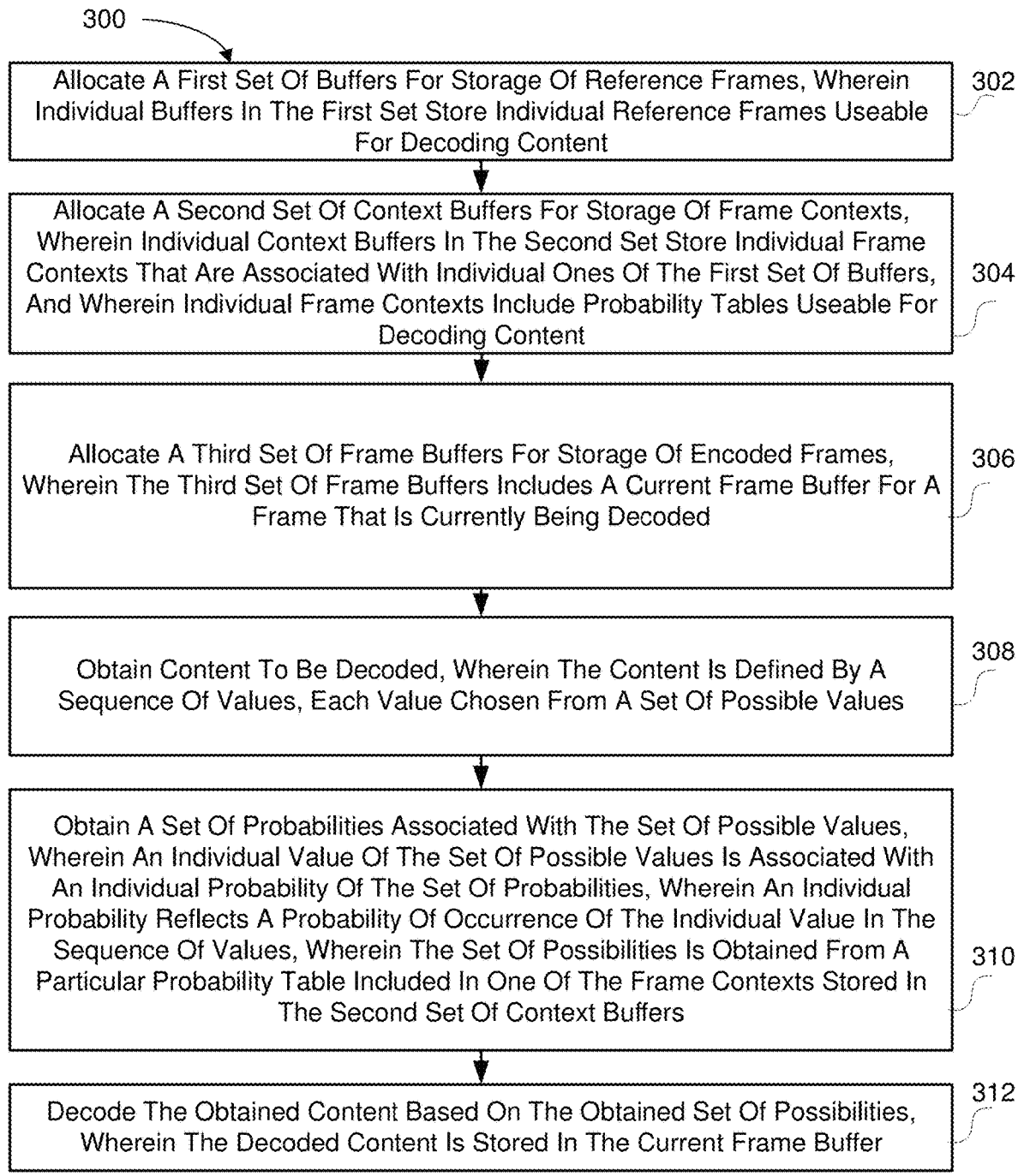

FIG. 2 illustrates a method 200 for encoding content. FIG. 3 illustrates a method 300 for decoding content. The operations of methods 200 and 300 presented below are intended to be illustrative. In some embodiments, methods 200 and 300 may be accomplished with one or more additional operations not described, and/or without one or more of the operations discussed. In some embodiments, two or more of the operations may occur substantially simultaneously.

Referring to FIG. 2 and method 200, at an operation 202, a first set of buffers is allocated for storage of reference frames. The first set includes at least four buffers. Individual buffers in the first set store individual reference frames usable for encoding content. In some embodiments, operation 202 is performed by a memory management component and/or a reference frame storage component the same as or similar to memory management component 21 and/or reference frame storage component 22 (shown in FIG. 1 and described herein).

At an operation 204, a second set of context buffers is allocated for storage of frame contexts. The second set includes at least four context buffers. Individual context buffers in the second set store individual frame contexts that are associated with individual ones of the first set of buffers. Individual frame contexts include probability tables usable for encoding content. In some embodiments, operation 204 is performed by a memory management component and/or a frame context storage component the same as or similar to memory management component 21 and/or frame context storage component 23 (shown in FIG. 1 and described herein).

At an operation 206, a third set of frame buffers is allocated for storage of encoded frames. Individual frame buffers in the third set includes one or more indicators that refer to individual ones of the reference frames stored in the first set of buffers. The third set of frame buffers includes a current frame buffer for a frame that is currently being encoded. In some embodiments, operation 206 is performed by a memory management component and/or frame buffer storage component the same as or similar to memory management component 21 and/or frame buffer storage component 24 (shown in FIG. 1 and described herein).

At an operation 208, content to be encoded is obtained. The content includes the set of frames. The individual frame in the set includes the sequence of values, each value chosen from the set of possible values. In some embodiments, operation 208 is performed by a content component the same as or similar to content component 25 (shown in FIG. 1 and described herein).

At an operation 210, a particular frame context is selected from the second set of context buffers. The particular frame context includes a particular probability table. In some embodiments, operation 210 is performed by a frame context selection component the same as or similar to frame context selection component 26 (shown in FIG. 1 and described herein).

At an operation 212, a set of probabilities associated with the set of possible values is obtained. An individual value of the set of possible values is associated with an individual probability of the set of probabilities. An individual probability reflects a probability of occurrence of the individual value in the sequence of values. The set of probabilities is obtained from the particular probability table. In some embodiments, operation 212 is performed by a probability component the same as or similar to probability component 27 (shown in FIG. 1 and described herein).

At an operation 214, the obtained content is encoded based on the obtained set of possibilities. The encoded content is stored in the current frame buffer. Encoding includes encoding the obtained content based on one or more of the reference frames stored in the first set of buffers. The one or more of the reference frames are referred to in the one or more indicators included in the current frame buffer, and encoding the obtained content based on the particular frame context and the particular probability table. In some embodiments, operation 214 is performed by an encode component the same as or similar to encode component 28 (shown in FIG. 1 and described herein).

Referring to FIG. 3 and method 300, at an operation 302, a first set of buffers is allocated for storage of reference frames. The first set includes at least four buffers. Individual buffers in the first set store individual reference frames usable for decoding content. In some embodiments, operation 302 is performed by a memory management component and/or a reference frame storage component the same as or similar to memory management component 21 and/or reference frame storage component 22 (shown in FIG. 1 and described herein).

At an operation 304, a second set of context buffers is allocated for storage of frame contexts. The second set includes at least four context buffers. Individual context buffers in the second set store individual frame contexts that are associated with individual ones of the first set of buffers. Individual frame contexts include probability tables usable for decoding content. In some embodiments, operation 304 is performed by a memory management component and/or a frame context storage component the same as or similar to memory management component 21 and/or frame context storage component 23 (shown in FIG. 1 and described herein).

At an operation 306, a third set of frame buffers is allocated for storage of encoded frames. The third set of frame buffers includes a current frame buffer for a frame that is currently being decoded. In some embodiments, operation 306 is performed by a memory management component and/or frame buffer storage component the same as or similar to memory management component 21 and/or frame buffer storage component 24 (shown in FIG. 1 and described herein).

At an operation 308, content to be decoded is obtained. The content is defined by the sequence of values, each value chosen from the set of possible values. In some embodiments, operation 308 is performed by a content component the same as or similar to content component 25 (shown in FIG. 1 and described herein).

At an operation 310, a set of probabilities associated with the set of possible values is obtained. An individual value of the set of possible values is associated with an individual probability of the set of probabilities. An individual probability reflects a probability of occurrence of the individual value in the sequence of values. The set of probabilities is obtained from a particular probability table included in one of the frame contexts stored in the second set of context buffers. In some embodiments, operation 310 is performed by a probability component the same as or similar to probability component 27 (shown in FIG. 1 and described herein).

At an operation 312, the obtained content is decoded based on the obtained set of possibilities. The decoded content is stored in the current frame buffer. Decoding the obtained content is further based on one or more of the reference frames stored in the first set of buffers, and decoding the obtained content is further based on the particular probability table. In some embodiments, operation 312 is performed by a decode component the same as or similar to decode component 29 (shown in FIG. 1 and described herein).

In some embodiments, method 200 and/or 300 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 and/or method 300 in response to instructions stored electronically on one or more electronic storage mediums. The one or more processing devices may include one or more devices configured through hardware, firmware, and/or software to be specifically designed for execution of one or more of the operation of method 200 and/or method 300.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that encodes content including a set of frames to be encoded, the system comprising
one or more physical processors configured by machine-readable instructions to:
allocate a first set of buffers for storage of reference frames, wherein the first set includes at least four buffers, wherein individual buffers in the first set store individual reference frames usable for encoding content;
allocate a second set of context buffers for storage of frame contexts, wherein the second set includes at least four context buffers, wherein each of the individual context buffers in the second set stores individual frame contexts associated with individual ones of the first set of buffers, and wherein individual frame contexts include probability tables usable for encoding content;
allocate a third set of frame buffers for storage of encoded frames, wherein individual frame buffers in the third set includes one or more indicators that refer to individual ones of the reference frames stored in the first set of buffers, and wherein the third set of frame buffers includes a current frame buffer;
obtain content to be encoded, wherein the content is defined by a sequence of values, each value chosen from a set of possible values, the content to be encoded including a frame currently being encoded in the current frame buffer;
select a particular frame context from the second set of context buffers associated with a particular reference frame referenced in one of the one or more indicators of the current frame buffer, wherein the particular frame context includes a particular probability table;
obtain a set of probabilities associated with the set of possible values from the particular probability table, wherein each individual value of the set of possible values is associated with an individual probability of the set of probabilities, wherein an individual probability reflects a probability of occurrence of the associated individual value; and
encode the obtained content based on the obtained set of probabilities,
wherein the encoded content is stored in the current frame buffer, wherein the
encoding the obtained content is based on
the one or more of the reference frames referred to in the one or more indicators included in the current frame buffer, and
is further based the particular probability table.

2. The system of claim 1, wherein the one or more reference frames stored in the first set of buffers include a first reference frame and a second reference frame, wherein the one or more indicators included in the current frame buffer include a first indicator and a second indicator, wherein the first indicator refers to the first reference frame, wherein the second indicator refers to the second reference frame, and wherein encoding the obtained content is based on the first and second reference frames.

3. The system of claim 2, wherein encoding the obtained content based on the first and second reference frames includes using a first probability table for the first reference frame and a second probability table for the second reference frame.

4. The system of claim 1, wherein the one or more reference frames stored in the first set of buffers include a first reference frame, a second reference frame, and a third reference frame, wherein the one or more indicators included in the current frame buffer include a first indicator, a second indicator, and a third indicator, wherein the first indicator refers to the first reference frame, wherein the second indicator refers to the second reference frame, wherein the third indicator refers to the third reference frame, and wherein encoding the obtained content is based on the first, second, and third reference frames.

5. The system of claim 1, wherein the one or more indicators include a particular indicator that refers to a particular reference frame stored in the first set of buffers, and wherein the obtained set of probabilities is obtained from the particular probability table included in the frame context that is associated with the particular reference frame that is referred to in the particular indicator included in the current frame.

6. The system of claim 1, wherein the obtained set of probabilities is obtained from the particular probability table included in the frame context that is associated with a particular reference frame, wherein the particular reference frame is selected from the first set of buffers by virtue of the ordering of the first set of buffers.

7. The system of claim 1, wherein the obtained set of probabilities is updated during encoding based on the obtained content.

8. The system of claim 1, wherein the obtained content includes at least one frame from the set of frames.

9. The system of claim 1, wherein the set of frames define a video sequence.

10. The system of claim 1, wherein the reference frames stored in the first set of buffers may include forward and backward reference frames.

11. A system that decodes encoded content, wherein the encoded content includes a set of frames, the system comprising:
one or more physical processors configured by machine-readable instructions to:
allocate a first set of buffers for storage of reference frames, wherein the first set includes at least four buffers, wherein individual buffers in the first set store individual reference frames usable for decoding content;
allocate a second set of context buffers for storage of frame contexts, wherein each of the individual context buffers in the second set stores individual frame contexts associated with individual ones of the first set of buffers, and wherein individual frame contexts include probability tables usable for decoding content;
allocate a third set of frame buffers for storage of decoded frames,
wherein the third set of frame buffers includes a current frame buffer;
obtain content to be decoded, wherein the content is defined by a sequence of values, each value chosen from a set of possible values, the content to be decoded including a frame currently being decoded in the current frame buffer;
obtain a set of probabilities associated with the set of possible values from a particular probability table included in one of the frame contexts stored in the second set of context buffers, wherein each individual value of the set of possible values is associated with an individual probability of the set of probabilities, wherein an individual probability reflects a probability of occurrence of the associated individual value; and
decode the obtained content based on the obtained set of probabilities,
wherein the decoded content is stored in the current frame buffer, wherein decoding the obtained content is based on one or more of the reference frames stored in the first set of buffers, and is further based on the particular probability table.

12. A method of encoding content including a set of frames to be encoded, wherein an individual frame in the set includes a sequence of values, each value chosen from a set of possible values, and wherein the set of frames is arranged in an ordered sequence, the method comprising:
allocating a first set of buffers for storage of reference frames, wherein the first set includes at least four buffers, wherein individual buffers in the first set store individual reference frames usable for encoding content;
allocating a second set of context buffers for storage of frame contexts, wherein the second set includes at least four context buffers, wherein each of the individual context buffers in the second set stores individual frame contexts associated with individual ones of the first set of buffers, and wherein individual frame contexts include probability tables usable for encoding content;
allocating a third set of frame buffers for storage of encoded frames, wherein individual frame buffers in the third set includes one or more indicators that refer to individual ones of the reference frames stored in the first set of buffers, and wherein the third set of frame buffers includes a current frame buffer;
obtaining content to be encoded, wherein the content includes the set of
frames, wherein the individual frame in the set includes the sequence of values, each value chosen from the set of possible values, the content to be encoded including a frame currently being encoded in the current frame buffer;
selecting a particular frame context from the second set of context buffers associated with a particular reference frame referenced in one of the one or more indicators of the current frame buffer, wherein the particular frame context includes a particular probability table;
obtaining a set of probabilities associated with the set of possible values from the particular probability table, wherein each individual value of the set of possible values is associated with an individual probability of the set of probabilities, wherein an individual probability reflects a probability of occurrence of the associated individual value; and
encoding the obtained content based on the obtained set of probabilities, wherein the encoded content is stored in the current frame buffer, wherein the encoding is based on the one or more of the reference frames referred to in the one or more indicators included in the current frame buffer, and is further based on the particular probability table.

13. The method of claim 12, wherein the one or more reference frames stored in the first set of buffers include a first reference frame and a second reference frame, wherein the one or more indicators included in the current frame buffer include a first indicator and a second indicator, wherein the first indicator refers to the first reference frame, wherein the second indicator refers to the second reference frame, and wherein encoding the obtained content is based on the first and second reference frames.

14. The method of claim 13, wherein encoding the obtained content based on the first and second reference frames includes using a first probability table for the first reference frame and a second probability table for the second reference frame.

15. The method of claim 12, wherein the one or more indicators include a particular indicator that refers to a particular reference frame stored in the first set of buffers, and wherein the obtained set of probabilities is obtained from the particular probability table included in the frame context that is associated with the particular reference frame that is referred to in the particular indicator included in the current frame.

16. The method of claim 12, wherein the obtained set of probabilities is obtained from the particular probability table included in the frame context that is associated with a particular reference frame, wherein the particular reference frame is selected from the first set of buffers by virtue of the ordering of the first set of buffers.

17. The method of claim 12, wherein the obtained set of probabilities is updated during encoding based on the obtained content.

18. The method of claim 12, wherein the obtained content includes at least one frame from the set of frames.

19. The method of claim 12, wherein the set of frames define a video sequence.

20. A method of decoding encoded content, wherein the encoded content includes a set of frames to be decoded, wherein an individual frame in the set includes a sequence of values, each value chosen from a set of possible values, and wherein the set of frames is arranged in an ordered sequence, the method comprising:

- allocating a first set of buffers for storage of reference frames, wherein the first set includes at least four buffers, wherein individual buffers in the first set store individual reference frames usable for decoding content;
- allocating a second set of context buffers for storage of frame contexts, wherein the second set includes at least four context buffers, wherein each of the individual context buffers in the second set stores individual frame contexts associated with individual ones of the first set of buffers, and wherein individual frame contexts include probability tables usable for decoding content;
- allocating a third set of frame buffers for storage of encoded frames, wherein the third set of frame buffers includes a current frame buffer;
- obtaining content to be decoded, wherein the content is defined by the sequence of values, each value chosen from the set of possible values, the content to be decoded including a frame currently being decoded in the current frame buffer;
- obtaining a set of probabilities associated with the set of possible values from a particular probability table included in one of the frame contexts stored in the second set of context buffers, wherein each individual value of the set of possible values is associated with an individual probability of the set of probabilities, wherein an individual probability reflects a probability of occurrence of the associated individual value; and
- decoding the obtained content based on the obtained set of probabilities possibilities, wherein the decoded content is stored in the current frame buffer, wherein decoding the obtained content is based on one or more of the reference frames stored in the first set of buffers, and is further based on the particular probability table.

* * * * *